United States Patent [19]

Labib

[11] 4,405,670
[45] Sep. 20, 1983

[54] CAPACITANCE ELECTRONIC DISC STAMPER HAVING IMPROVED STAIN RESISTANCE AND METHOD FOR THE MANUFACTURE THEREOF

[75] Inventor: Mohamed E. Labib, Princeton, N.J.

[73] Assignee: RCA Corporation, New York, N.Y.

[21] Appl. No.: 383,264

[22] Filed: May 28, 1982

[51] Int. Cl.³ .................... B32B 3/00; C23C 15/00
[52] U.S. Cl. ................... 428/64; 346/135.1; 346/137; 369/276; 428/469
[58] Field of Search .............. 369/276, 283, 288; 346/135.1, 137; 428/64, 469

[56] References Cited

U.S. PATENT DOCUMENTS

| 3,909,517 | 9/1975 | Clemens | 369/283 X |
| 4,004,080 | 1/1977 | Vossen, Jr. et al. | 369/276 |
| 4,057,831 | 11/1977 | Jacobs et al. | 428/64 X |
| 4,077,051 | 2/1978 | Vossen, Jr. | 369/276 |
| 4,189,331 | 2/1980 | Roy | 428/469 X |

OTHER PUBLICATIONS

"Tarnishing of Nickel in Air at Temperatures from 23° to 200° C. and Relative Humidities from Ambient to 95%" by S. H. Kulpa and R. P. Frankenthal, *Electrochemical Society Solid-State Science and Technology*, Oct. 1977.

*Primary Examiner*—George F. Lesmes
*Attorney, Agent, or Firm*—Birgit E. Morris; Edward J. Sites

[57] ABSTRACT

Nickel stampers used for the molding of capacitive electronic discs are treated prior to use in the molding process by heating the stamper in the presence of an oxygen containing gas, at a temperature from about 220° C. to about 300° C. for 2 to 5 hours until a continuous protective oxide layer approximately 10-40 angstroms thick is formed on the surface of the stamper.

2 Claims, 3 Drawing Figures

BEFORE (650X)

AFTER (650X)

CAPACITANCE ELECTRONIC DISC STAMPER HAVING IMPROVED STAIN RESISTANCE AND METHOD FOR THE MANUFACTURE THEREOF

This invention relates to stampers used in the molding of capacitive electronic discs, and more particularly, with such stampers that have improved resistance to staining.

BACKGROUND OF THE INVENTION

Capacitive electronic discs are molded plastic records which have television program information recorded in the surface thereof. A capacitive electronic disc, when played on a suitable player of the capacitive electronic pickup type, will provide television signal information which can be used to reproduce the programming recorded on the disc on a conventional television receiver.

Capacitive electronic discs are typically about 12 inches in diameter and have the television signal information recorded in a spiral information track which is formed in the playing surface of the disc. Although the capacitive electronic discs are somewhat similar in overall appearance to a conventional long-playing audio record, capacitive electronic discs are distinctly different with regard to the specifics of the actual recording made in the discs. There are, for example, about 10,000 information tracks per inch in a capacitive electronic disc, which is about 40 times greater than the groove density of a conventional audio record. Furthermore, the television signal information is recorded as vertical undulations in the base of the information track. The undulations of the capacitive electronic disc are about 1500 times smaller in amplitude and about 15 times smaller in wavelength than the corresponding signal information of a conventional audio record.

Because of the very small dimensions of the recorded signal elements of capacitive electronic discs, extreme care has to be taken to prevent any changes in the surface of the disc as these changes can adversely affect the quality of the television signals which are reproduced on playback of the discs. It has been found, for example, that defects only a few microns in size, which would have virtually no effect on playback of a conventional audio record, can cause major problems on playback of a capacitive electronic disc, such as the complete loss of the television signal.

Small defects in capacitive electronic disc which are, for example, about up to 5 microns in size, are referred to as microdefects to distinguish them from large defects such as dents, scratches and the like. Microdefects constitute one of the major causes for rejection of capacitive electronic discs and has proven to be one of the most difficult problems to overcome in commercial production. The microdefects in the molded disc, particularly if the microdefects are present in a high concentration in a given area, are believed to be a principle cause of a defect which is referred to as staining. A disc which is stained when examined in bright light will have dull areas or an overall hazy appearance instead of having a bright lustrous appearance. The appearance of the disc would seem to indicate to the unaided eye that the disc is stained on its surface with a foreign substance. However, more careful examination often shows that most of the areas that appeared stained on the surface of the disc are not contaminated with a foreign material as is a conventional stain, but rather the stains are in face mold impressions formed in the surface of the disc. Furthermore, the stained areas are often found to be areas which contained a high concentration of microdefects which have the effect of dulling optical reflection from the surface of the disc.

Many of the problems encountered with the microdefects and the related staining has been traced back to the production processes employed in the manufacture of discs. In the manufacture of capacitive electronic discs, the initial step is to record the desired television signal information on a magnetic tape. This tape is then used to drive a cutter head which cuts the desired signal information in the form of a spiral groove in a copper recording substrate. The copper recording substrate is then replicated by electroforming nickel on the recorded surface of the substrate to form a negative replica called a master. The master is then in turn, replicated by electroforming nickel on the surface of the master to form a series of positive replicas referred to as molds. The molds in turn are replicated by electroforming nickel onto the surface of the molds to form a series of parts which are referred to as stampers. The electroforming bath used in the replication process is of a modified nickel sulfamate type containing, in addition to the nickel sulfamate, various additives such as brighteners and the like, to ensure that the resulting electroformed parts are as conformal as possible with the surface of the parts on which they are electroformed.

The stampers are the parts which are actually used to press to capacitive electronic discs. The stampers prior to use are examined for defects, such as dents, microdefects and staining. Stampers which show any major defect or any significant staining, or the like, are either repaired prior to use or scrapped. The satisfactory stampers are then mounted on the molding platens of a record molding press. To mold the capacitive electronic discs a specially formulated electrically conductive plastic composition is molded under heat and pressure between a pair of the stampers. The information track which is in the stamper is reproduced in its mirror image in the molded disc. In addition to the desired information which is reproduced in the molded disc, however, any defects in the stampers are likewise reproduced in the surface of the molded disc.

Once the stamper is installed in the press and a number of discs are pressed from the record, it is often observed that a considerable amount of serious staining will start to occur on the stamper faces which is then replicated in the molded disc formed on the stained stampers. The staining which occured can broadly be classified in two groups; namely, additive staining and corrosive staining. Additive staining is generally caused by a foreign substance, such as water, contacting the surface of the stamper and leaving a residue when it drys. This type of staining can be removed with solvents or the like. However, the second and more serious type of staining that is observed is corrosive staining. Corrosive staining causes erosion of the surface of the stamper. The stamper when examined microscopically, can be seen to have a large number of microdefects in the surface of the stamper which tends to increase in size and depth as additional discs are molded with the stampers. The effects of corrosive staining cannot be repaired and eventually results in the stampers having to be scrapped.

The problem of corrosive staining of the stampers during molding is especially troublesome and difficult to overcome in that while all present stampers appeared to be subject to some degree of staining, certain batches of stampers have been found to have fair to good resistance to staining, while other batches of stampers almost immediately start staining once they are used to mold discs.

What would be highly desirable would be a capacitive electronic disc stamper which would have improved resistance to corrosive staining during the molding and also a method for consistently producing stampers having improved resistance to staining.

SUMMARY OF THE INVENTION

Nickel stampers used for the molding of capacitive electronic discs are treated prior to use in the molding process by heating the stamper in the presence of oxymgen at a temperature from about 220° C. to about 300° C. for 2 to 5 hours until a continuous protective oxide layer approximately 40 angstroms thick is formed on the surface of the stamper.

DETAILED DESCRIPTION OF THE INVENTION

Figure 1:
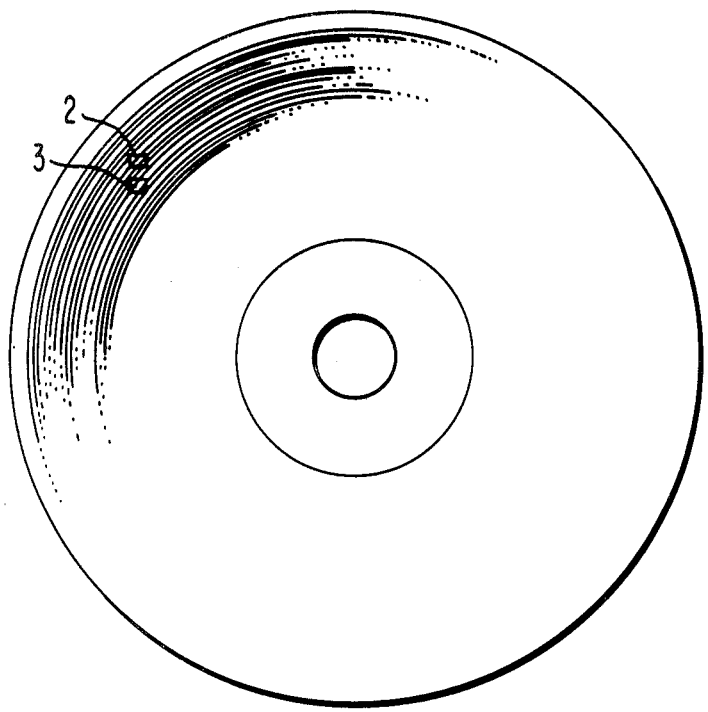
FIG. 1 is a top plan view of a capacitive electronic disc stamper.

The term staining as used hereinafter in this specification, shall specifically refer to corrosive staining which causes the erosion of the surface of the stamper, rather than staining resulting from residues left on the stamper as for example by water drops or fingerprints and the like.

In making an evaluation of the corrosive staining problem which occurs as the stampers are used for molding of capacitive electronic discs, it was found as noted above that certain batches of stampers exhibited significantly better resistance to staining than other batches of stampers. It should be noted, however, that even the staining resistance of the better batches of stampers was still at best only marginal for commercial production of capacitive electronic discs.

Stampers from various batches that exhibited different staining characteristics were evaluated to determine what, if any, differences existed between the stampers. The elemental chemical composition of the nickel stampers at the molding surface was determined by Auger analysis. It was found that the stampers which had the least resistance to staining had the highest amount of trace impurities such as sulfur and carbon incorporated in the deposited nickel. The exact sources of the sulfur and carbon contaminates is not certain but it is believed the sulfur is incorporated in the nickel during the electroforming from the nickel sulfamate and the carbon comes from the organic additives used in the electroforming bath. The chemical analysis of the surface of the stampers also confirmed the presence of oxygen in the outer surface of the stamper, which indicates that a nickel oxide layer is formed on the surface as a result of exposure to air. The amount of oxygen in the surface of the stampers was found to be directly related to the resistance of the stampers to staining, with stampers having the highest amount of oxygen exhibiting the best resistance to staining. Also, since the stampers with the highest amount of sulfur and carbon in the outer surface areas had the lowest amount of oxygen, it is believed that the sulfur and carbon impurities inhibit the oxidation of the nickel at ambient environmental conditions.

It is known that when nickel is exposed to air that the surface will rapidly oxidize to some extent to form an oxide coating on the surface of nickel articles. Tests were conducted to determine the quality of the nickel oxide coating which inherently formed on the surface of the stampers. The quality of the coatings was specifically examined with regard to the presence of pinholes or other defects in the coating. The stampers were immersed in a 0.02 N silver nitrate solution for 60 seconds and then rinsed in distilled water. When the stampers were examined using an optical microscope at 750 magnification, it could be observed that the inherently formed layer of oxide on the surface of all the stampers was discontinuous. The silver nitrate decomposes and deposits as bright silver on contact with the bare nickel exposed through the pinholes and other defects in the oxide coating. The amount of the pinholes, again was found to be directly related to the antistaining properties, with those stampers having the fewest pinholes and the lowest density of pinholes having the best antistaining properites. The thickness of the inherently formed nickel oxide layer on the stamper was found to be quite thin, being less than 5 angstroms.

The molding compound used for molding of the capacitive electronic disc was also evaluated as a possible cause of staining. The molding compound used for the manufacture of the capacitive electronic disc has a formulation which is substantially different from the formulation used for conventional audio records. The compound for the capacitive electronic disc contains, in addition to vinyl resin, a substantial amount of special grades of carbon black so that the molded plastic is electrically conductive. The carbon black used for this purpose, as well as certain other additives such as antistatic agents and lubricants, were also found to contain both elemental sulfur as well as combined sulfur. In order to determine what affect the molding compound might have on the stampers, and particularly on the staining of the stampers, sections of virgin stampers were brought into contact with the molten compound used for the molding of the disc in a manner simulating the pressing of a disc. After a single pressing, it was found that the compound discolored the stamper in the area where the nickel was exposed through the pinholes in the oxide layer inherently formed on the stamper, and that portions of the nickel were then transferred to the molded piece. The reaction of the molding compound with the exposed nickel surface and the removal of a portion of the nickel was found to be repeated on each subsequent molding cycle. The phenomenon accounted, in part, for the gradual but steady development of staining as stampers are used in commercial production.

It was then found that the staining of the stampers could be significantly reduced or eliminated by heating the stampers to an elevated temperature in the presence of oxygen. Stampers which exhibited some resistance to staining as well as those which were known to readily stain were found, after heat treatment, to exhibit excellent resistance to staining. Indeed, the treated stampers were found to have almost complete resistance to staining during their useful life as stampers.

The heat treatment which was used, consists of heating the stampers while they are supported on a suitable plate or the like with the molding surface exposed to a temperature of between 260° C. and about 300° C. for a period of time from 2 to 5 hours in the presence of an oxygen containing gas, such as filtered air. After treatment, the stampers were reevaluated for chemical composition at the surface of the stampers and it was found that the level of impurities, particularly the level of sulfur and carbon in the surface of all the stampers, was significantly reduced so as to be almost nonexistent. More significantly, however, it was found that when the silver nitrate test was repeated that the oxide layer on the surface areas of the stampers was free to essentially free of pinholes. The test for stainning was repeated with both standard molding compound used for capacitive electronic disc and also a molding compound which had been altered by the addition of 1% by weight of additional elemental sulfur. In both of these evaluations, the stampers treated in accordance with the present invention were found to exhibit no substantial staining properties.

The oxide layer which was formed on the surface of the stamper was found to be about 10 to about 40 Å in thickness depending on treatment conditions. In production runs using the stamper, it was found that the oxide coating was of a sufficient thickness and adequately adhered to the surface so as to prevent staining throughout the entire production run.

The final test utilized in the evaluation of the method of this invention, was to determine if the protective layer had any adverse effects on the quality of the recording or of the reproduction of the television program information on playback of the molded disc. For this purpose, a series of stampers were employed. Capacitive electronic discs were pressed on virgin stampers. The defect level and the signal-to-noise ratio as well as the overall quality of the signal produced on playback of the disc was determined. At the same time, stampers from the same batches were also evaluated by first heat treating the stampers and then pressing discs with the stampers. It was found that the discs pressed with the treated stampers were equivalent to the virgin, untreated stampers having at least equivalent satisfactory signal-to-noise ratio as well as other playback properties.

Various techniques and temperatures were then evaulated for the purpose of treatment of the stamper. It was found that a temperature of at least 220° C. was required in order to obtain a pinhole-free coating on the surface of the disc. Temperatures in excess of about 300° C. were not required and excessive temperatures were found to have the adverse effect of significantly annealing and softening the stamper surfaces. It was also found that a time—temperature relationship existed with regard to the quality and thickness of the coating. About 2 to 5 hours of heat treatment at between 220° C. and 300° C. in oxygen of air resulted in a continuous pinhole free coating. The heating time could be extended but a point of diminishing return is reached with regard to the relative thickness of the coating required and that which is obtained. The thickness of the oxide layer should be at least 10 Å in thickness and preferably about 40 Å in thickness. The thicker the layer the more permanent and microdefect free will be the layer up to about 40 Å being optimum. The treatment can also be conducted in a pure oxygen atmosphere or enriched oxygen atmosphere but has been found that treatment in air is quite adequate for the purposes of this invention. However, care has to be taken to insure that the air or the oxygen which is employed is free of impurities, particularly dirt particles and oils, since these impurities can be deposited on the stamper and can prevent complete treatment of the surface.

It was further found that if some moisture is incorporated into the air or oxygen used in the treatment of the stampers that an approximately about 10% thicker layer can be obtained in the same time period.

The following examples are given by way of further illustration of the present invention and are not intended, in anyway, to limit the scope of the present invention.

EXAMPLE 1

A nickel stamper was selected from a batch of stampers which were known to heavily stain during pressing of capacitive electronic discs. The overall surface of the virgin untreated stamper was examined microscopically and was found to have an almost uniform distribution of pinholes and other microdefects in the recorded area of the stampers.

Figure 2:
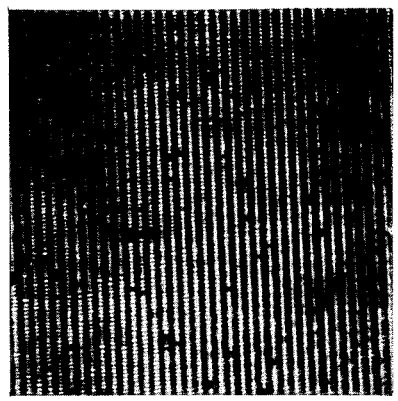
FIG. 2 is a 650× microphotograph of a section of a stamper taken as indicated by the lines and arrows 2 on FIG. 1 prior to treatment in accordance with the teachings of the present invention.

A number of sections were then cut from the stamper as indicated by the squares 2 and 3 on FIG. 1 for further testing and evaluation. Each section was examined and found to be virtually identical in appearance with regard to the presence of pinholes and microdefects. In FIG. 2 there is shown a 650× photomicrograph of the surface of a section as removed prior to treatment and which has been stained by silver deposition to more clearly show the presence of the pinholes and defects. The microdefects in the coating are seen as dark spots on the surface of the photomicrograph of FIG. 2.

The additional sections were then treated at various temperatures, times and under various moisture conditions. Sections were heat treated by being placed in an oven with the recorded surface exposed to a flow of filtered air. The thickness of the nickel oxide films formed on the molding surface of the sections under the various conditions was measured and are listed below:

| | |
|---|---|
| Control sample #1 (no treatment) | 2–3 A |
| Control sample #2 (no treatment) | <5 A |
| 220° C., 2 hours, dry air | 10–12 A |
| 260° C., 5 hours, dry air | 40 A |
| 260° C., 5 hours, moist air | 44 A |
| 300° C., 2 hours, dry air | 17 A |
| 300° C., 16 hours, dry air | 49 A |

Figure 3:
FIG. 3 is a 650× microphotograph taken as indicated by the lines and arrows 3 on FIG. 1 after treatment in accordance with the teachings of this invention.

The sections after treatment were reexamined and photographed. FIG. 3 is a 650× photomicrograph of a section treated at 260° C. for 5 hours in dry air. The photomicrograph shows that all of the microdefects and pinholes in the sample were healed during the heating process.

EXAMPLE 2

The procedure of Example 1 was repeated with stampers known to have relatively satisfactory resistance with regard to being antistaining. It was found that the surfaces of these stampers were likewise, substantially improved by the heat treatment.

EXAMPLE 3

In order to determine the effect of the treatment on the performance of the stampers and on the quality of the capacitive electronic disc molded on the stampers, sets of stampers from given batches were evaluated with one of the stampers being left in an untreated state and the other being treated at 280° C. for five hours in dry air. The first disc molded on the untreated stamper was used as a standard for measuring quality of the molded discs. The disc produced on the treated stampers was found to be at least equivalent in the critical signal-to-noise ratios as the standard disc formed on the untreated stamper. Thereafter, additional discs were pressed on the treated and untreated stampers. It was found that as the molding proceeded, noticeable staining began to appear on the untreated stampers after about 40 to 50 discs were pressed on the stampers, while at the same time and under the same conditions, the treated stampers showed no staining whatsoever and remained free of microdefects. The evaluation of the discs made on the untreated stamper and the treated stamper after several hundred discs were pressed showed that the discs pressed on untreated stampers developed significant staining while the discs produced on the treated stamper were unchanged with regard to staining.

I claim:

1. An improved stamper for molding a capacitive electronic disc, said stamper being formed of nickel and having an information containing track defined in the molding surface thereof, said molding surface having formed thereon a continuous conformal layer of nickel oxide which is free, to substantially free, of microdefects and which is about 10 to 40 angstroms in thickness.

2. The stampers according to claim 1 wherein the nickel oxide layer on the surface of the stamper is about 40 angstroms in thickness.

* * * * *